United States Patent
Miller et al.

(10) Patent No.: US 6,533,935 B2
(45) Date of Patent: *Mar. 18, 2003

(54) DRAIN VALVE FOR FUEL FILTER WATER SEPARATOR

(75) Inventors: Paul D. Miller, Cookeville, TN (US); John Arnett, Cookeville, TN (US); Melvin D. McCormick, Cookeville, TN (US)

(73) Assignee: Fleet Guard, Inc., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/997,795

(22) Filed: Nov. 30, 2001

(65) Prior Publication Data

US 2002/0036163 A1 Mar. 28, 2002

Related U.S. Application Data

(62) Division of application No. 09/412,713, filed on Oct. 5, 1999, now Pat. No. 6,358,416.

(51) Int. Cl.⁷ .................. F16K 24/00; F16K 11/087; B01D 35/01; B01D 35/00
(52) U.S. Cl. .................. 210/248; 210/313; 210/541; 137/588
(58) Field of Search .................. 210/248, 313, 210/541; 137/588, 589

(56) References Cited

U.S. PATENT DOCUMENTS

| | | |
|---|---|---|
| 253,405 A | 2/1882 | Maxfield |
| 410,448 A | 11/1889 | Riggin |
| 807,285 A | 12/1905 | Ketelsen |
| 928,813 A | 7/1909 | Spikes |
| 1,711,537 A | 5/1929 | Lewis et al. |
| 2,054,488 A | 9/1936 | Sinks |
| 2,113,046 A | 4/1938 | Freemon |
| 2,878,829 A | 3/1959 | Folmsbee |
| 3,005,475 A | 10/1961 | Beall |
| 3,234,958 A | 2/1966 | Butters |
| 3,322,280 A | 5/1967 | Taylor |
| 3,405,601 A | 10/1968 | Clarke |
| 3,450,157 A | 6/1969 | Hewson |

(List continued on next page.)

FOREIGN PATENT DOCUMENTS

| | | |
|---|---|---|
| DE | 3723-696 A | 3/1989 |
| EP | 0553919 | 8/1993 |
| JP | 46-32903 | 9/1971 |

*Primary Examiner*—Thomas M. Lithgow
(74) *Attorney, Agent, or Firm*—Andrus, Sceales, Starke & Sawall, LLP

(57) ABSTRACT

A drain valve for a fuel filter water separator for an internal combustion engine has a first port mating with the vent opening of the separator, a second port mating with the drain opening of the separator, and a third port. The drain valve is actuatable between a closed position blocking communication of the first port with the third port and blocking communication of the second port with the third port, and an open position providing communication of the first port with the third port and providing communication of the second port with the third port. If the valve is actuated to the open position when the engine is off, collected water and vent air each flow through the third port but in opposite directions. If the drain valve is actuated while the engine is running, pressurized fuel spray from the vent opening and collected water from the drain opening of the separator each flow through the third port in the same direction.

12 Claims, 16 Drawing Sheets

U.S. PATENT DOCUMENTS

| | | |
|---|---|---|
| 3,768,659 A | 10/1973 | Miller |
| 3,894,559 A | 7/1975 | DePuy |
| 3,980,457 A | 9/1976 | Smith |
| 4,010,101 A | 3/1977 | Davey |
| 4,334,989 A | 6/1982 | Hall |
| 4,437,986 A | 3/1984 | Hutchins et al. |
| 4,440,193 A | 4/1984 | Matheson |
| 4,500,425 A | 2/1985 | Thornton et al. |
| 4,515,690 A | 5/1985 | Yasuhara |
| 4,602,657 A | 7/1986 | Anderson, Jr. et al. |
| 4,611,627 A | 9/1986 | Eidsvoog et al. |
| 4,708,171 A | 11/1987 | Cudaback |
| 4,724,074 A | 2/1988 | Schaupp |
| 4,753,266 A | 6/1988 | Matheson et al. |
| 4,846,223 A | 7/1989 | Humbert |
| 4,855,041 A | 8/1989 | Church et al. |
| 4,877,218 A | 10/1989 | Kasner |
| 4,922,960 A | 5/1990 | Oelschlaegel |
| 4,951,918 A | 8/1990 | Wells et al. |
| 4,976,285 A | 12/1990 | Church et al. |
| 5,029,606 A | 7/1991 | Kuhlthau, Jr. |
| 5,433,242 A | 7/1995 | Buchtel |
| 5,606,989 A | 3/1997 | Roll et al. |
| 5,855,772 A | 1/1999 | Miller et al. |
| 6,358,416 B1 * | 3/2002 | Miller et al. |

\* cited by examiner

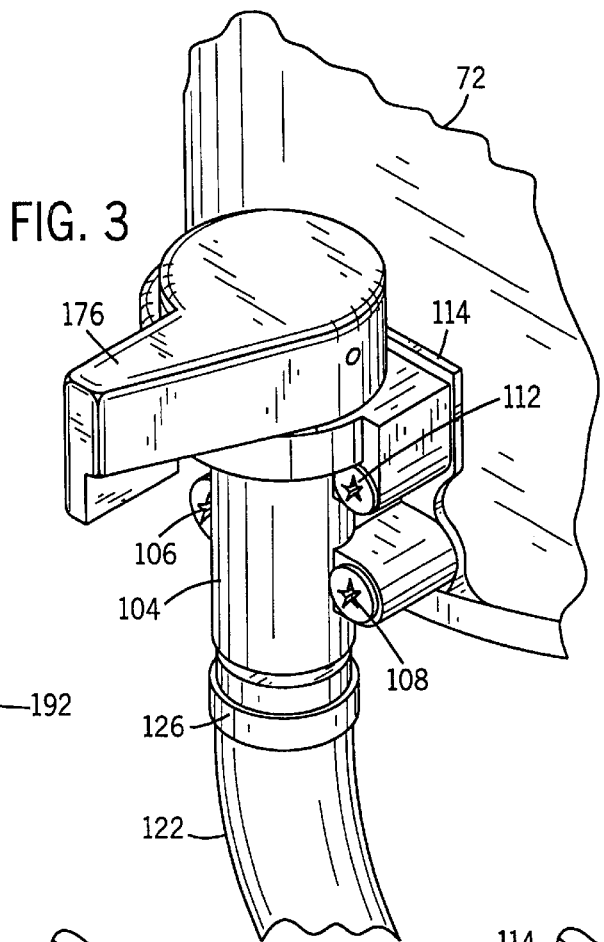
FIG. 3
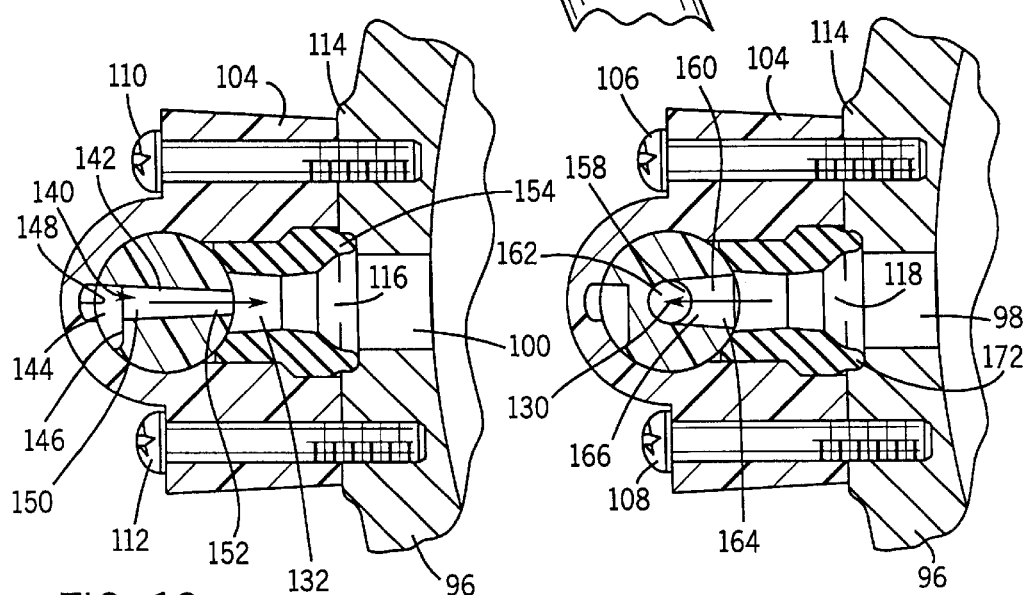
FIG. 14
FIG. 12
FIG. 13

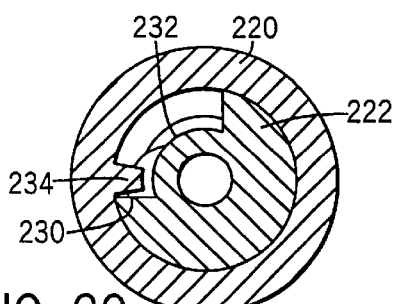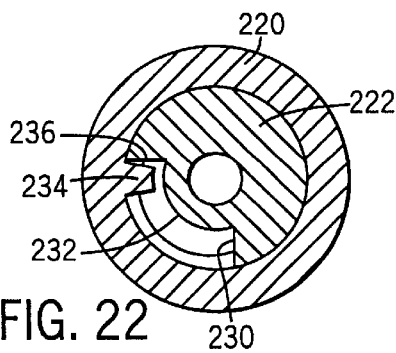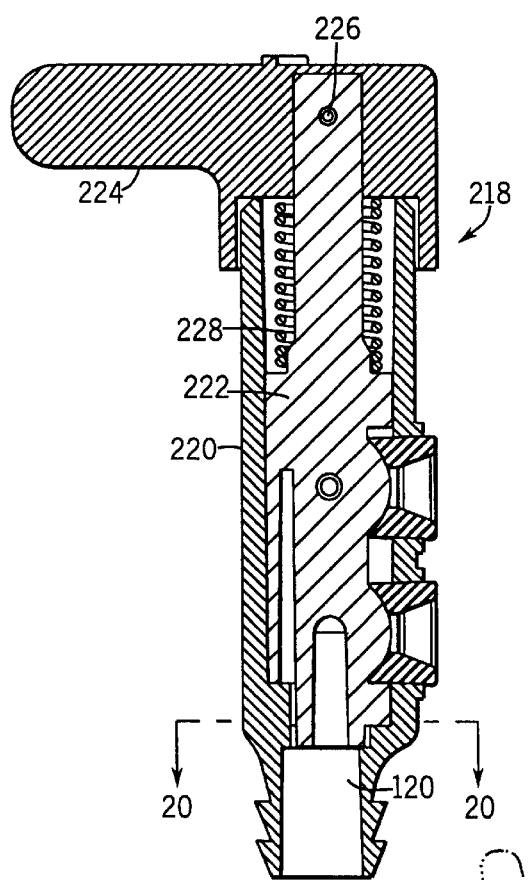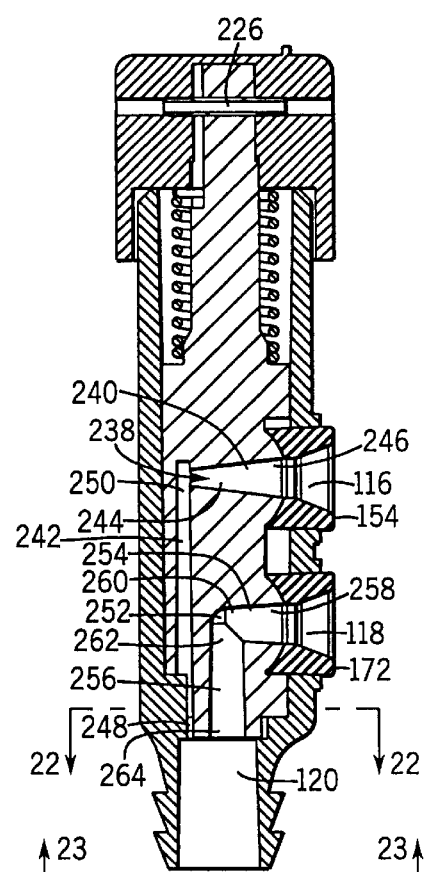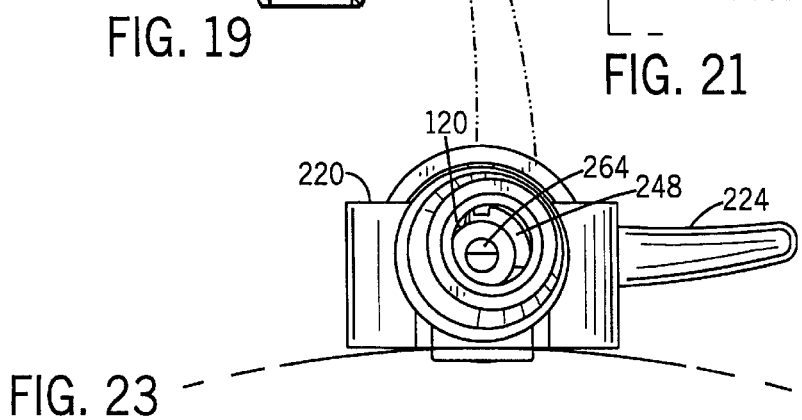

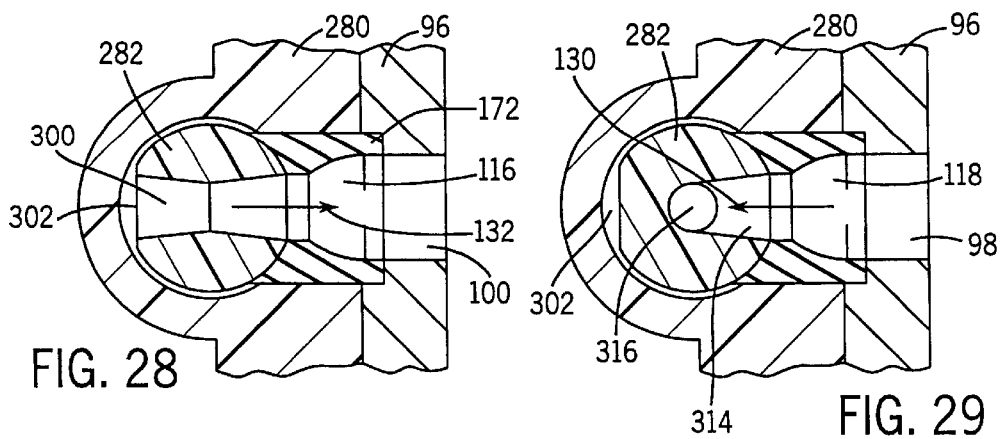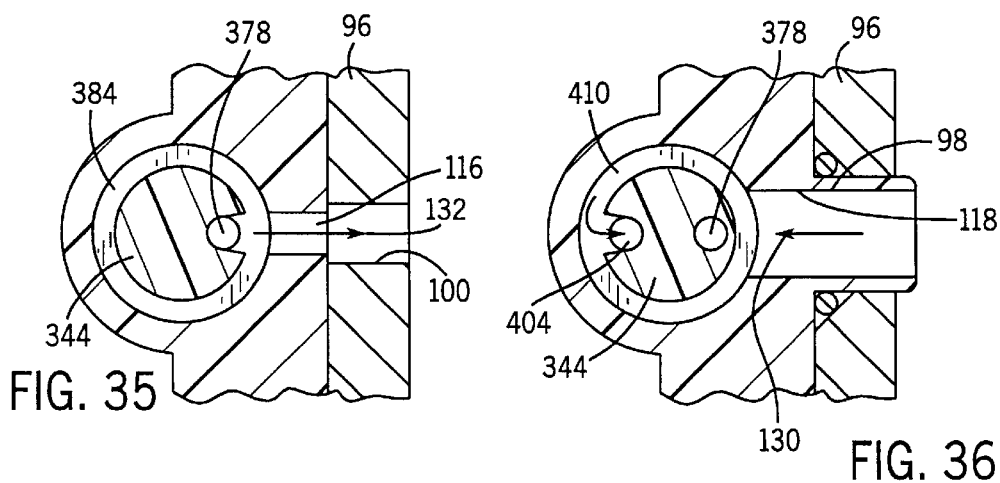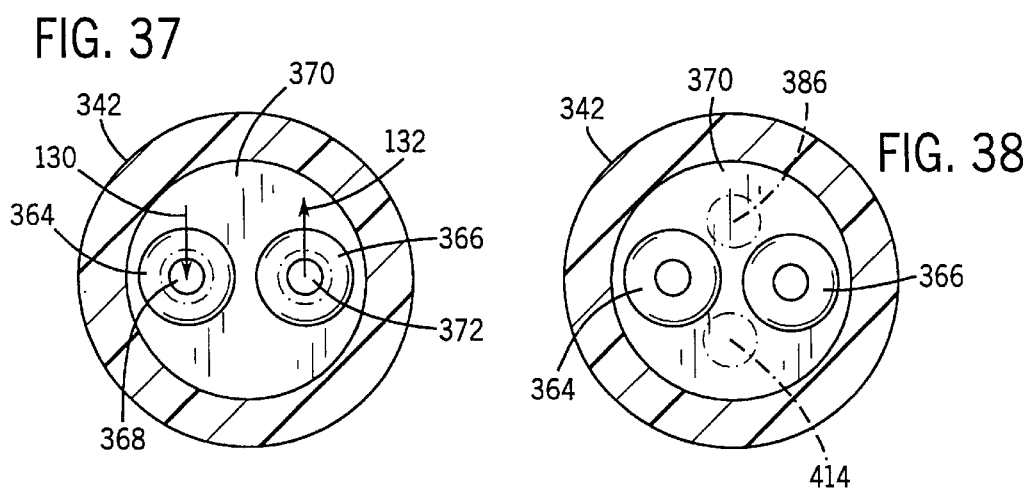

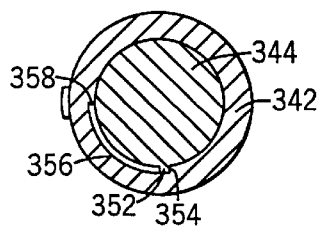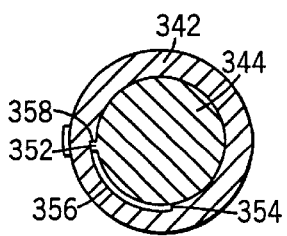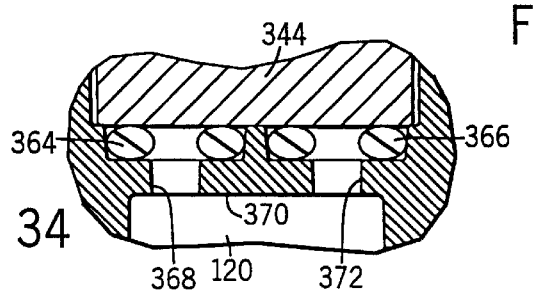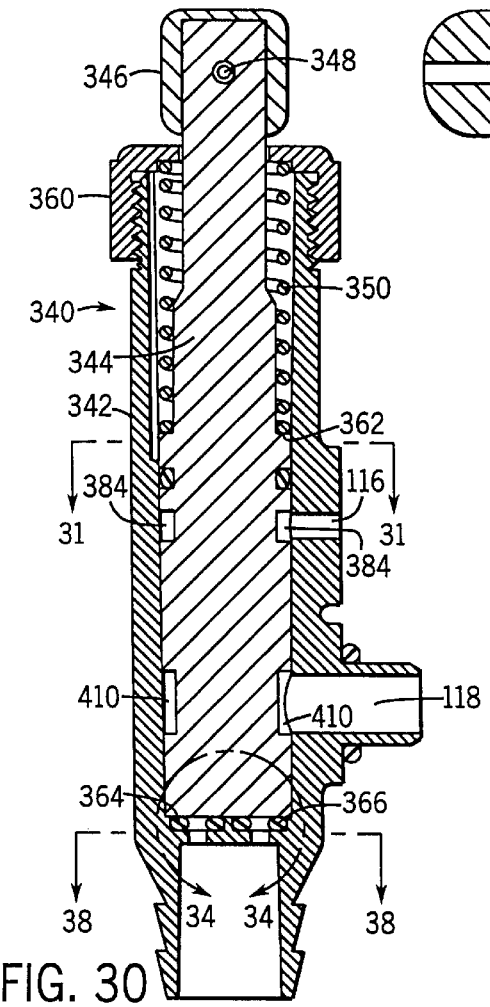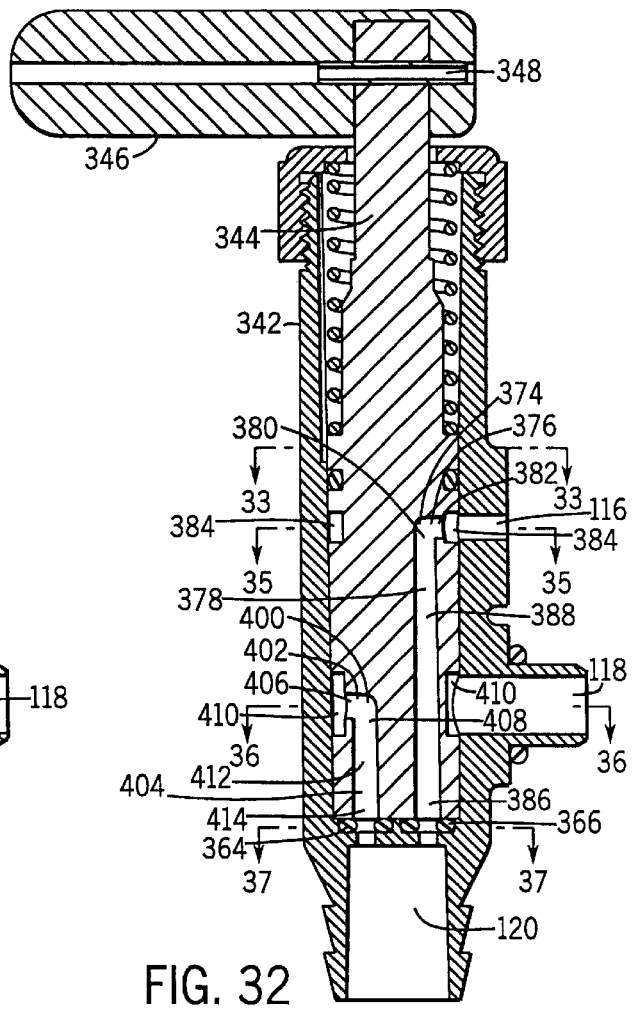

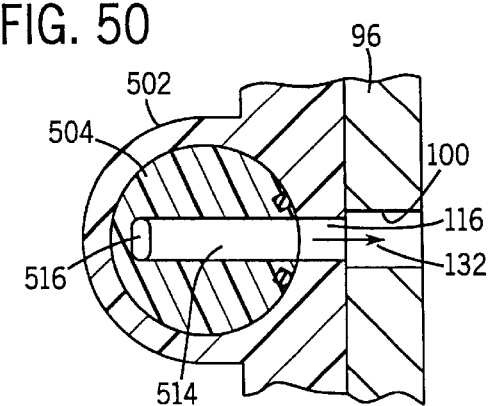
FIG. 50
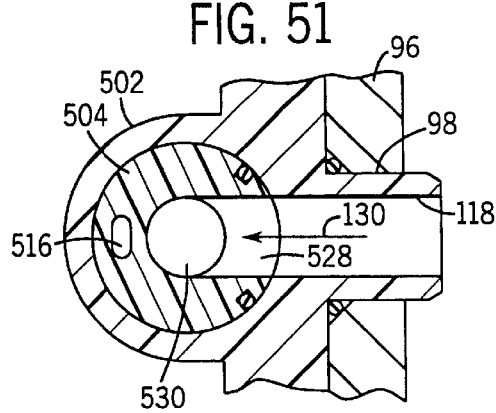
FIG. 51
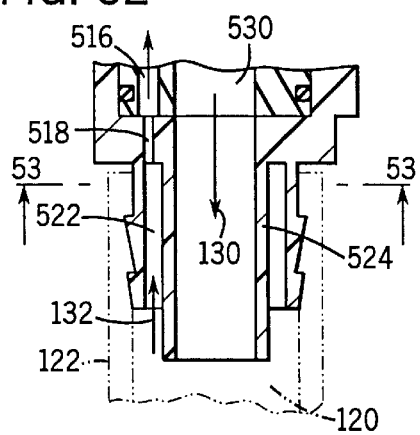
FIG. 52
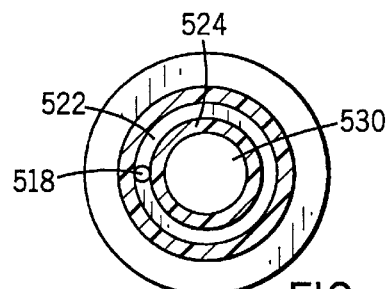
FIG. 53
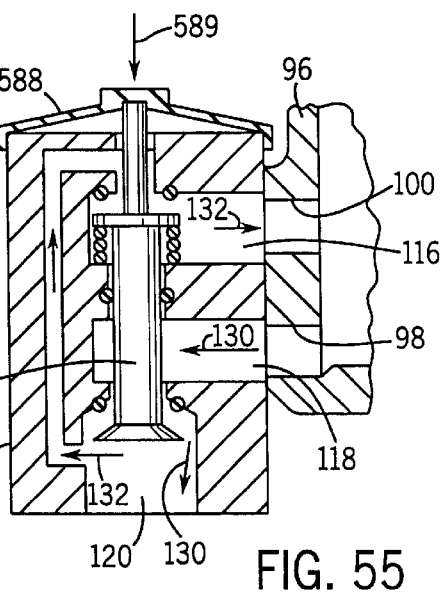
FIG. 54
FIG. 55

DRAIN VALVE FOR FUEL FILTER WATER SEPARATOR

CROSS REFERENCE TO RELATED APPLICATION

This application is a division of U.S. application Ser. No. 09/412,713, filed Oct. 5, 1999 (U.S. Pat. No. 6,358,416).

BACKGROUND AND SUMMARY

The invention relates to fuel filter water separators for internal combustion engines, usually diesel engines, and more particularly to a drain valve therefor.

Diesel fuel tends to contain relatively high levels of impurities such as particulate matter and water, as compared to corresponding levels in other liquid hydrocarbon fuels. As a consequence, diesel fuel typically needs to be filtered before injecting the diesel fuel into the engine. The concern over the levels of particulate matter and water in the diesel fuel are significant due to the problems which can be caused. Particulate matter can clog fuel lines and fuel injectors and cause deposits to be formed in the combustion chamber. When water-laden diesel fuel is run through a fuel system and engine, the presence of the water can cause the fuel injection system to malfunction due to rust, corrosion, deposits, etc. Excessive levels of water may lead to catastrophic injector nozzle failure due to the effects of steam expansion and/or lubricity effects.

Fuel filter water separators are known in the prior art for filtering the particulate matter and removing the water. Fuel filter water separators with a drain valve for periodically draining the collected water are also known in the prior art, for example as shown in U.S. Pat. No. 5,855,772, incorporated herein by reference.

The present invention provides an improved drain valve for a fuel filter water separator. The fuel filter water separator has a housing defining a water collection space and a vent space. The housing has a wall with a drain opening therethrough for draining water from the water collection space, and a vent opening therethrough and permitting incoming air to replace outgoing water. The engine has a running condition wherein the fuel filter water separator is pressurized, and an off condition wherein the fuel filter water separator is not pressurized. The drain valve includes a housing mounted to the fuel filter water separator housing and having a first port mating with the vent opening, a second port mating with the drain opening, and a third port. An actuator member in the drain valve housing is actuatable between a closed position blocking communication of the first port with the third port and blocking communication of the second port with the third port. The actuator member in the drain valve housing is actuatable to an open position providing communication of the first port with the third port and providing communication of the second port with the third port. In a typical situation, when the operator sees an indication that water is present, he turns off the engine, thus depressurizing the fuel filter water separator, and opens the drain valve by actuating the actuator member to the open position, and collected water and vent air each flow through the noted third port, but in opposite directions, i.e., if the operator opens the drain valve during the off condition of the engine with the fuel filter water separator not pressurized, the first port draws air through the vent passage from around the drain stream of collected water flowing in the opposite direction in the third port. In one embodiment, if the actuator member of the drain valve is actuated to the open position when the engine is in the running condition and providing pressurized fuel at the noted vent opening, then fuel spray from the vent opening and collected water from the drain opening of the fuel filter water separator housing each flow through the noted third port in the same direction, i.e. if the operator opens the drain valve during the running condition of the engine with the fuel filter water separator pressurized, a pressurized fuel vent stream from the first port joins the drain stream from the second port at the third port and flows in the same direction therethrough.

BRIEF DESCRIPTION OF THE DRAWINGS

FIG. 3 is an assembled perspective view of the drain valve of FIGS. 1 and 2.

FIG. 12 is a sectional view taken along line 12—12 of FIG. 9

FIG. 13 is a sectional view taken along line 13—13 of FIG. 9.

FIG. 14 is a sectional view taken along line 14—14 of FIG. 10.

FIG. 19 is a sectional view of another embodiment of a drain valve in accordance with the invention.

FIG. 20 is a sectional view taken along line 20—20 of FIG. 19.

FIG. 21 is a sectional view showing the valve of FIG. 19 in the open position.

FIG. 22 is a sectional view taken along line 22—22 of FIG. 21.

FIG. 23 is a bottom end elevation view taken along line 23—23 of FIG. 21.

FIG. 28 is a sectional view taken along line 28—28 of FIG. 26.

FIG. 29 is a sectional view taken along line 29—29 of FIG. 26.

FIG. 30 is a sectional view showing another embodiment of a drain valve in accordance with the invention.

FIG. 31 is a sectional view taken along line 31—31 of FIG. 30.

FIG. 32 is a sectional view showing the drain valve of FIG. 30 in the open position.

FIG. 33 is a sectional view taken along line 33—33 of FIG. 32.

FIG. 34 is an enlarged view of a portion of FIG. 30 as shown at line 34—34 in FIG. 30.

FIG. 35 is a sectional view taken along line 35—35 of FIG. 32.

FIG. 36 is a sectional view taken along line 36—36 of FIG. 32.

FIG. 37 is a sectional view taken along line 37—37 of FIG. 32.

FIG. 38 is a sectional view taken along line 38—38 of FIG. 30.

FIG. 50 is a sectional view taken along line 50—50 of FIG. 49.

FIG. 51 is a sectional view taken along line 51—51 of FIG. 49.

FIG. 52 is an enlarged view of a portion of FIG. 49.

FIG. 53 is a sectional view taken along line 53—53 of FIG. 52.

FIG. 54 is a sectional view of another embodiment of a drain valve in accordance with the invention.

FIG. 55 is a sectional view showing the drain valve of FIG. 54 in the open position.

DETAILED DESCRIPTION

Figure 1:
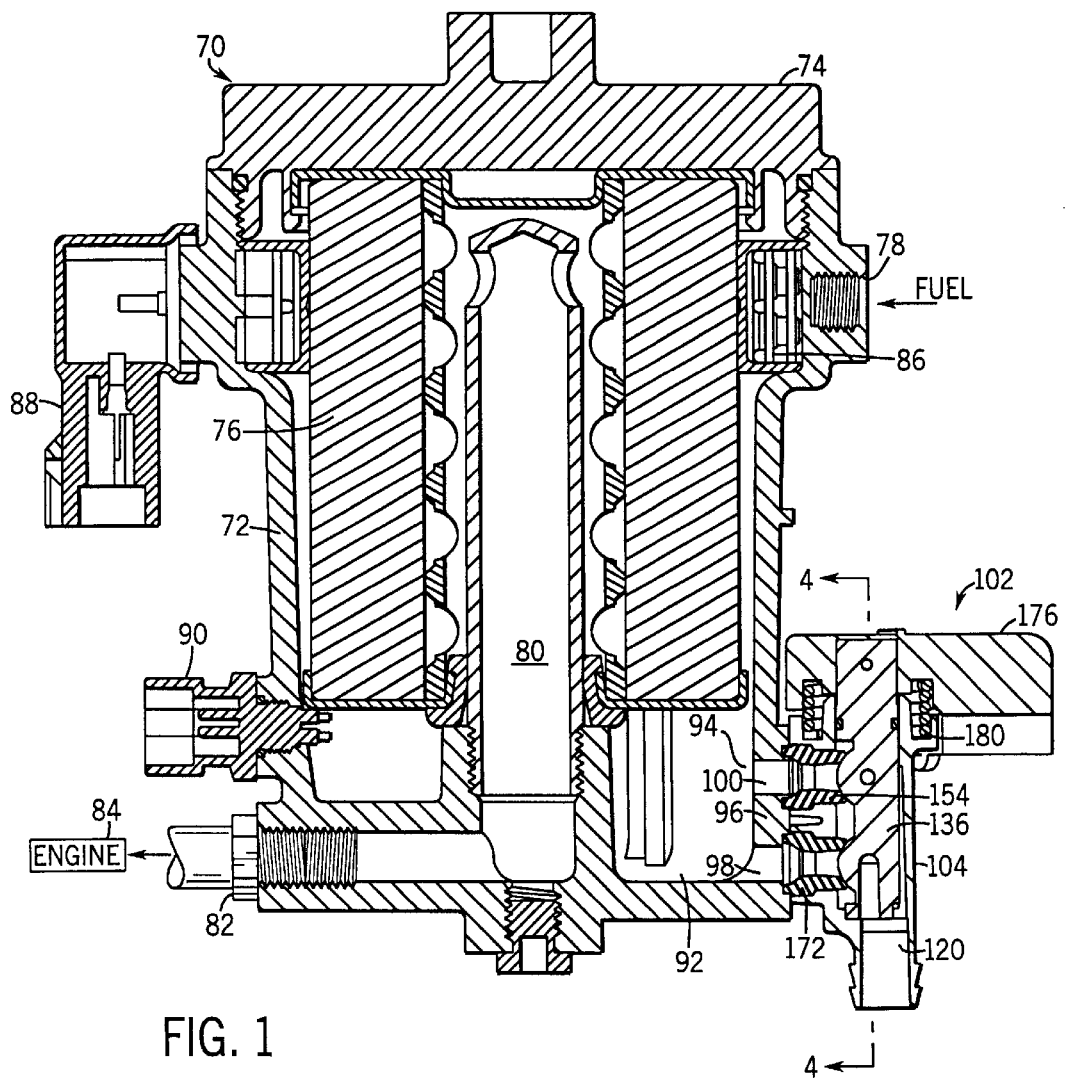
FIG. 1 is like FIG. 7 of incorporated U.S. Pat. No. 5,855,772 but shows a drain valve in accordance with the present invention.

FIG. 1 shows a fuel filter water separator 70 and will be only briefly described since it is also shown at 20 in incorporated U.S. Pat. No. 5,855,772 to which further reference may be had. Fuel filter water separator 70 includes a housing 72 closed by a threaded lid 74 and having a filter and water separating element 76 therein. Diesel fuel enters at fuel inlet 78, flows radially inwardly through annular filter element 76 to hollow interior 80 and then flows through fuel outlet 82 to the fuel injection system of internal combustion engine 84, such as a diesel engine. The housing includes a heater ring 86 for heating the diesel fuel to prevent it from coalescing in cold weather, a heater connector/thermostat assembly 88, and a water-in-fuel (WIF) sensor 90, all as is known in the prior art and as shown in the incorporated '772 patent. Housing 72 defines a water collection space 92 and a vent space 94. The housing has a wall 96 with a drain opening 98 therethrough for draining water from the water collection space. The wall has a vent opening 100 therethrough and permitting incoming air to replace outgoing water. The engine has a running condition wherein the fuel system including the fuel filter water separator is pressurized, and an off condition wherein the fuel system and fuel filter water separator is not pressurized. As is known, it is typical to drain collected water from housing 72 with the engine in the off condition. This is done by allowing collected water to flow through drain opening 98, and allowing incoming vent air to flow through vent opening 100 to replace the outgoing water and allow flow thereof. In the noted pressurized condition, fuel pressure in the fuel filter water separator provides pressurized fuel at vent opening 100, such that if the control valve therefor is opened during the running condition of the engine, pressurized fuel sprays outwardly through vent opening 100.

Figure 2:
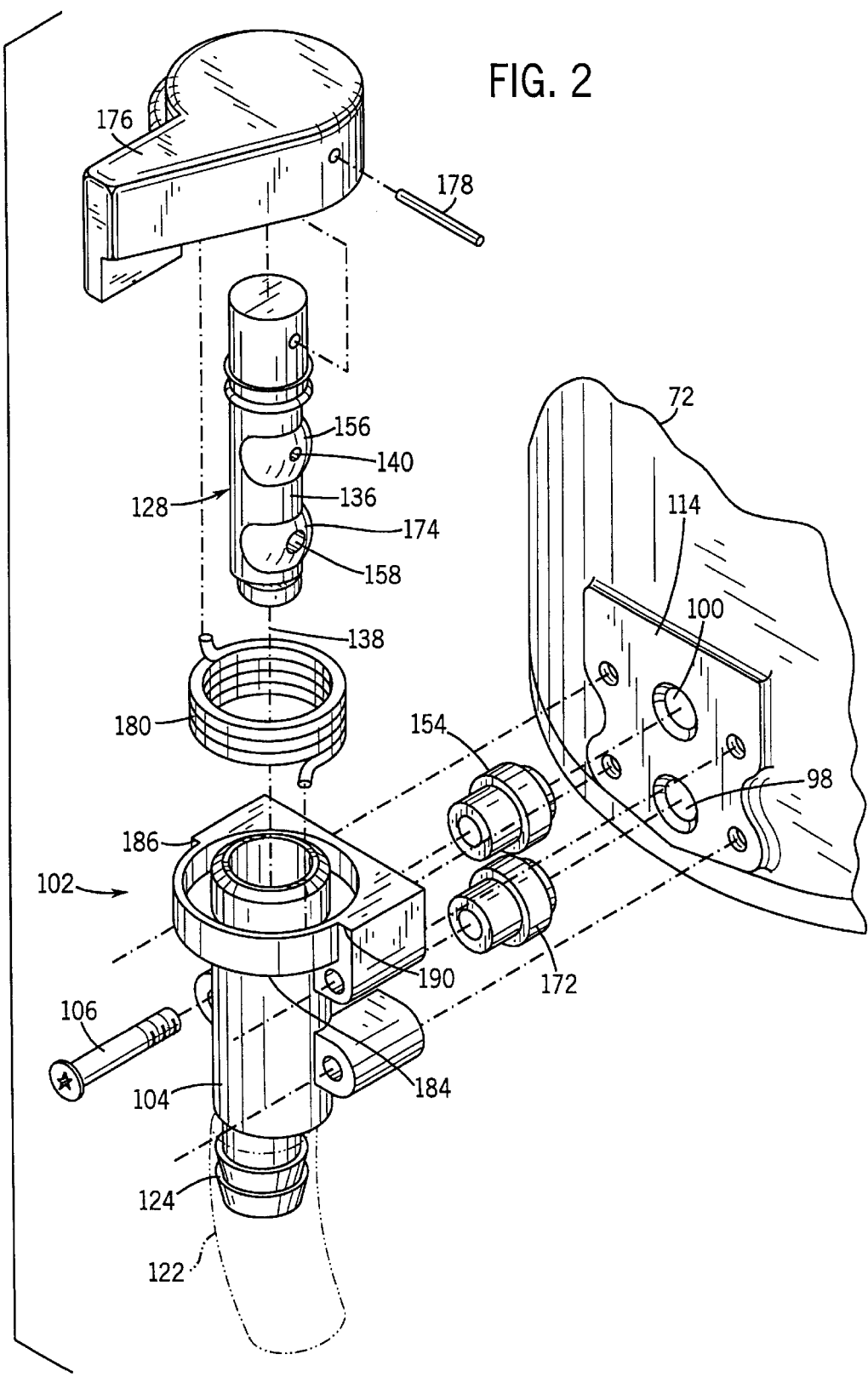
FIG. 2 is an exploded perspective view of the drain valve of FIG. 1.
Figure 5:
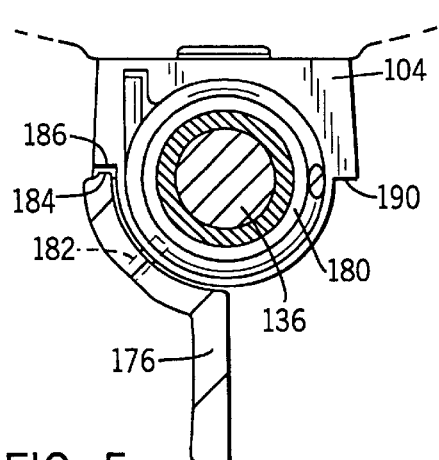
FIG. 5 is a sectional view taken along line 5—5 of FIG. 4.
Figure 6:
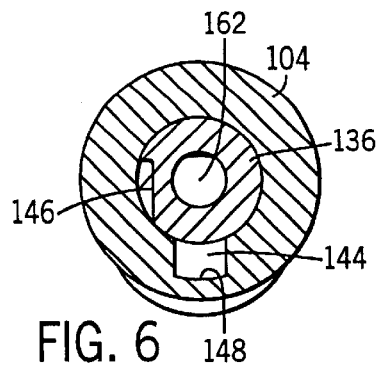
FIG. 6 is a sectional view taken along line 6—6 of FIG. 4.

Drain valve 102 includes a housing 104, FIG. 2, mounted to fuel filter water separator housing 72 by bolts 106, 108, 110, 112, FIGS. 2, 3, 12, 13, threaded into respective blind holes in increased thickness section 114 of the fuel filter water separator housing wall. The drain valve housing has a first port 116, FIGS. 9 and 12 mating with vent opening 100. The drain valve housing has a second port 118, FIGS. 9 and 13, mating with drain opening 98. The drain valve housing has a third port 120, FIGS. 1 and 9, at the bottom thereof which is a combined vent and drain port and to which a drain hose 122, FIGS. 2 and 3, may be connected at outer barbs 124 and retained by clamp 126.

An actuator member 128 in drain valve housing 104 is actuatable between a closed position, FIGS. 1–7, and an open position, FIGS. 8–14. The closed position blocks communication of first port 116 with third port 120 and blocks communication of second port 118 with third port 120. The open position provides communication of first port 116 with third port 120 and provides communication of second port 118 with third port 120. If actuator member 128 of drain valve 102 is actuated to the open position when the engine is in the noted off condition, collected water and vent air each flow through third port 120, but in opposite directions, FIG. 9, as shown at drain stream 130 and vent air stream 132. First port 116 draws air through the vent passage, to be described, from around drain stream 130 of collected water flowing in the opposite direction in third port 120.

Figure 9:
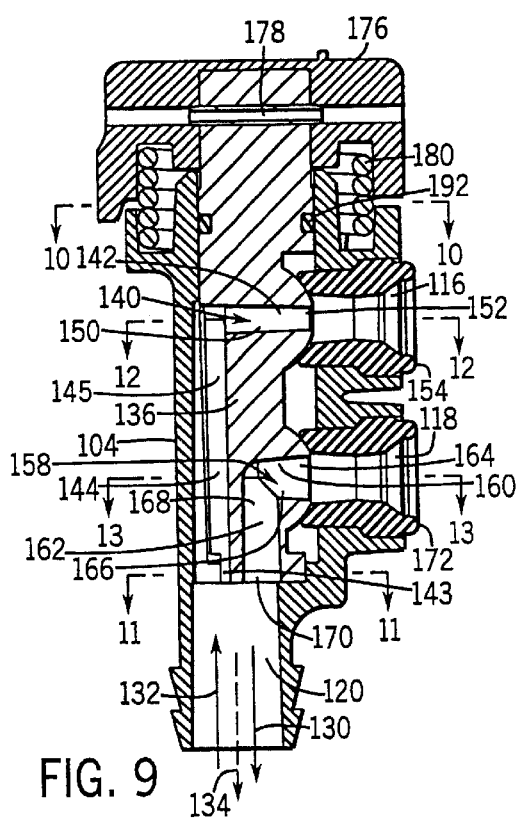
FIG. 9 is a sectional view taken along line 9—9 of FIG. 8.

If actuator member 128 of drain valve 102 is actuated to the open position when the engine is in the noted running condition, pressurized fuel spray from vent opening 100 and collected water from drain opening 98 of the fuel filter water separator housing each flow through third port 120 in the same direction as shown as fuel spray phantom arrow 134 and drain arrow 130, FIG. 9. In such instance, a pressurized fuel vent stream 134 from first port 116 joins drain stream 130 from second port 118 at third port 120, and streams 134 and 130 flow in the same direction through port 120 to exit same, preferably through drain hose 122, FIG. 3.

The drain valve has preferred vertical or gravitational orientation of the ports, particularly desirable for the noted non-pressurized drain cycle, i.e. with the engine in the noted off condition. Third port 120 is gravitationally below second port 118 which in turn is gravitationally below first port 116. Third port 120 is gravitationally below drain opening 98 which in turn is gravitationally below vent opening 100.

In FIG. 2, actuator member 128 is a rotary piston 136 rotatable about a vertical axis 138. A vent passage 140, FIGS. 2, 4, 9, 12, has a first portion 142, FIGS. 4, 9, 12, extending radially through piston 136, relative to axis 138, and a second portion 144, FIGS. 4, 9, 11, extending axially along a gap between piston 136 and drain valve housing 104. In the open position of the valve, FIG. 9, such gap is between a flat surface 146, FIGS. 11, 12, on the outer surface of the piston, and a notched surface 148 on the inner cylindrical surface of the drain valve housing. First portion 142 of vent passage 140 extends between an upstream end 150 and a downstream end 152, FIGS. 9 and 12. Second portion 144 of vent passage 140 extends between an upstream end 143, FIG. 9, and a downstream end 145. Downstream end 145 of second portion 144 is continuous with and in continuous communication with upstream end 150 of first portion 142, including in both of the noted open and closed positions. Downstream end 152 of first portion 142 communicates with first port 116 when piston 136 is in the noted open position, as shown in FIGS. 9 and 12. Downstream end 152 is blocked from communication with first port 116 when piston 136 is in the noted closed position, FIG. 4. An annular sealing grommet 154, FIGS. 2, 9, 12, radially bears between drain valve housing 104 and piston 136 at first port 116. Piston 136 is preferably formed with a ball socket portion 156, FIG. 2, at vent port 140 to facilitate engagement with sealing grommet 154 and rotation of piston 136 while maintaining the seal. Upstream end 143 of second portion 144 of the vent passage is in communication with third port 120 in each of the open and closed positions of the piston.

Figure 7:
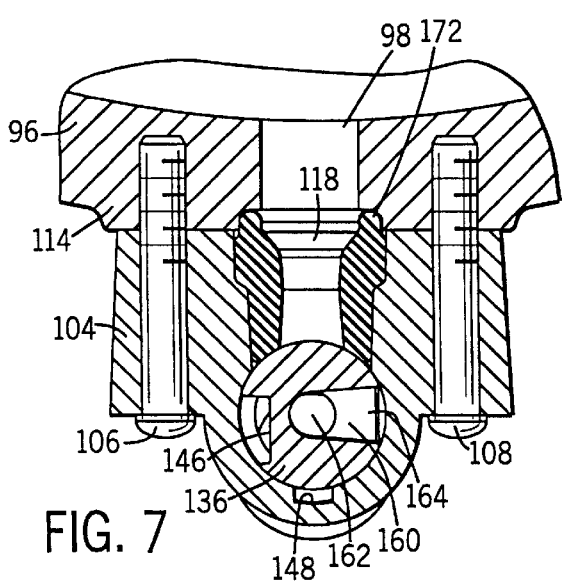
FIG. 7 is a sectional view taken along line 7—7 of FIG. 4.
Figure 4:
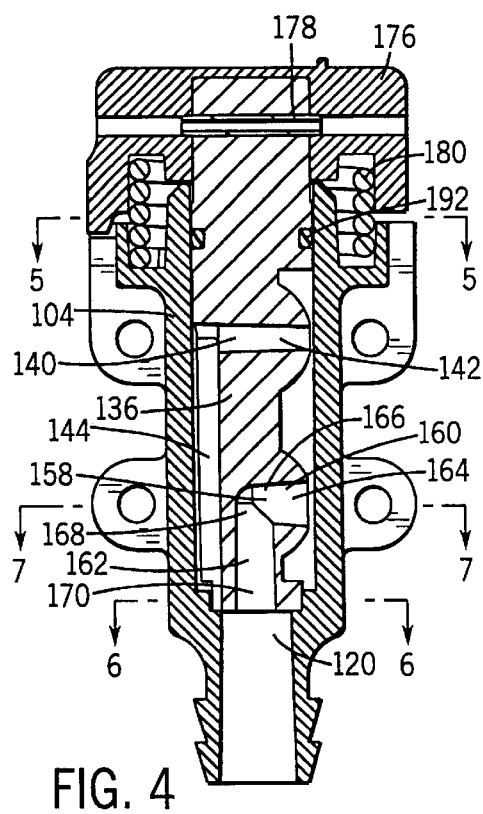
FIG. 4 is a sectional view taken along line 4—4 of FIG. 1, and shows the valve in the closed position.
Figure 10:
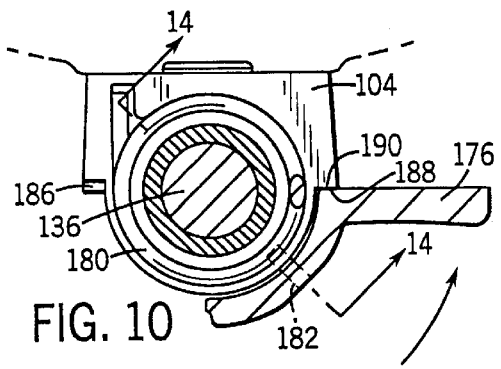
FIG. 10 is a sectional view taken along line 10—10 of FIG. 9.
Figure 11:
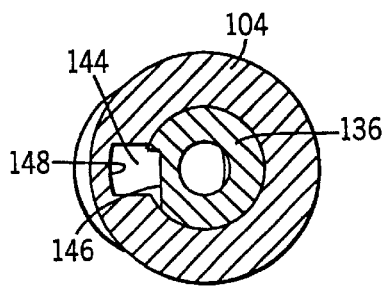
FIG. 11 is a sectional view taken along line 11—11 of FIG. 9.
Figure 8:
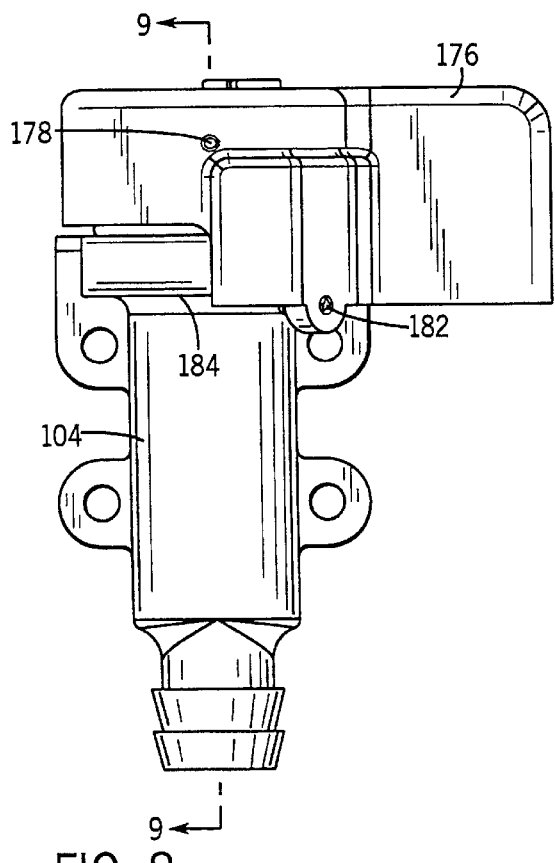
FIG. 8 is a side elevation view of the valve of FIGS. 3 and 4, but shows the valve in the open position.

A drain passage 158, FIGS. 2, 4, 9, 13, has a first portion 160, FIGS. 4, 9, 13, extending radially in piston 136, relative to axis 138, and a second portion 162 extending axially in piston 136. First portion 160 extends between an upstream end 164 and a downstream end 166. Second portion 162 extends between an upstream end 168 and a downstream end 170. Upstream end 168 of second portion 162 is continuous with and in continuous communication with downstream end 166 of first potion 160 including in each of the noted open and closed positions of the piston. Downstream end 170 of second portion 162 is in communication with third port 120 in each of the open and closed positions of the piston. Upstream end 164 of first portion 160 is in communication with second port 118 when piston 136 is in the open position as shown in FIGS. 9 and 13. Upstream end 164 is blocked from communication with second port 118 when piston 136 is in the closed position, as shown in FIGS. 4 and 7. An annular sealing grommet 172, FIGS. 2, 7, 9, 13, radially bears between drain valve housing 104 and piston 136 at second port 118. Piston 136 is provided with a second ball socket portion 174, FIG. 2, around drain passage 158 to facilitate and maintain the seal against sealing grommet 172 and to maintain such seal during rotation of piston 136.

Drain valve 102 includes an manually engageable upper handle 176, FIGS. 1 and 2, non-rotatably secured to piston 136 by roll pin 178. Coil spring 180 is a return spring and biases the valve handle to return to the closed position, FIGS. 1–7, when released by the operator. Ball 5 sockets 156 and 174 on piston 136 in cooperation with grommets 154 and 172, respectively, axially locate piston 136 in housing 104 and retain the piston in the housing. Additional retention is preferably provided by pin 182, FIGS. 8, 14, engaging the underside of housing lip 184, FIGS. 2, 14. In the closed position of the valve, FIG. 5, edge 184 of the handle is stopped against shoulder 186 of housing 104. When the valve is actuated to the open position, handle 176 is manually rotated by the operator 90° counter-clockwise to the position shown in FIG. 10, with handle edge 188 stopped against shoulder 190 of housing 104. O-ring 192, FIGS. 4, 9, permits the noted rotation while sealing the interior of the valve.

Figure 16:
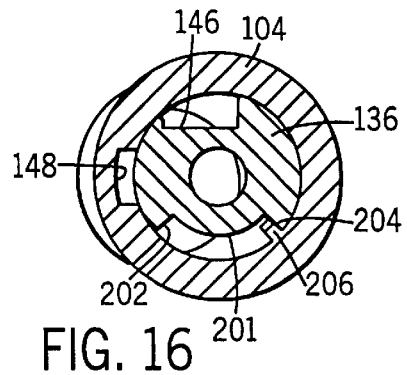
FIG. 16 is a sectional view taken along line 16—16 of FIG. 15.
Figure 18:
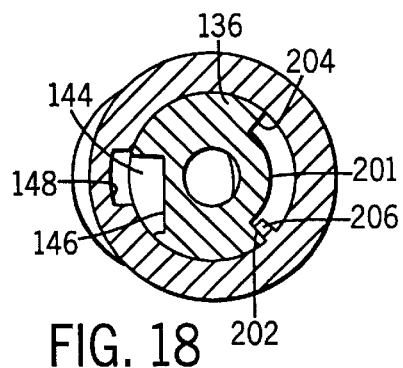
FIG. 18 is a sectional view taken along line 18—18 of FIG. 17.
Figure 15:
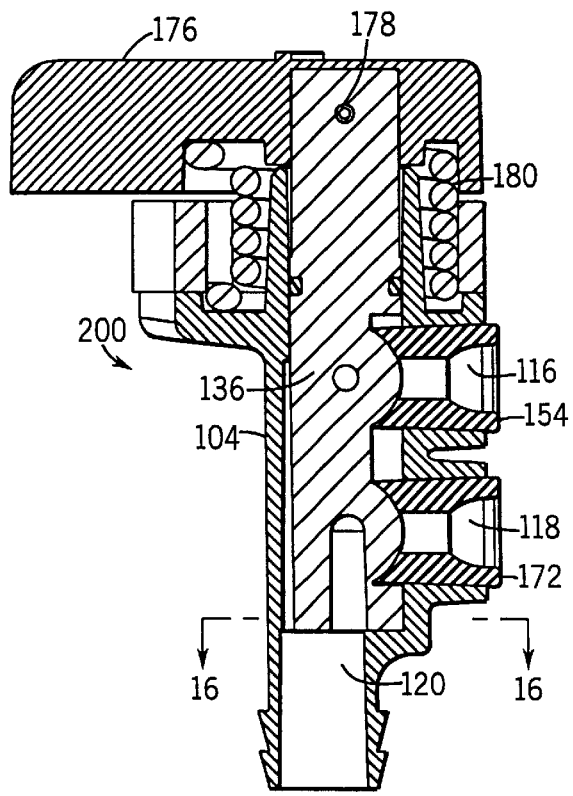
FIG. 15 is a sectional view of another embodiment of a drain valve in accordance with the invention.
Figure 17:
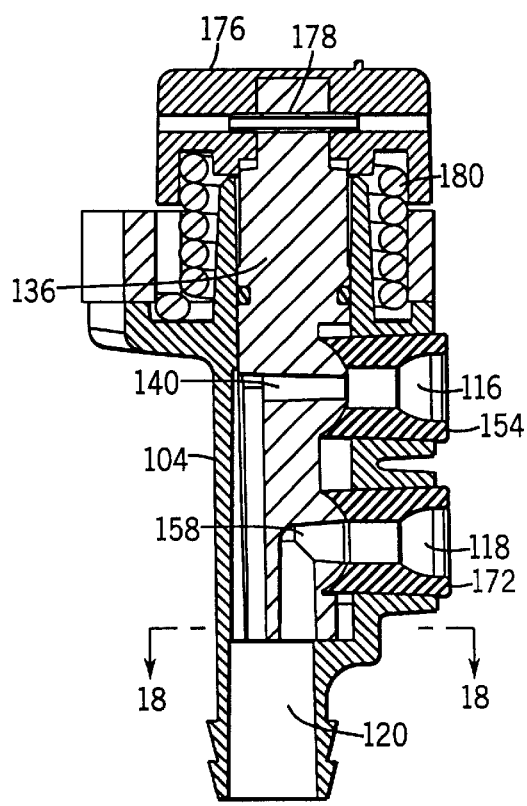
FIG. 17 is a sectional view showing the valve of FIG. 15 in the open position.
Figure 25:
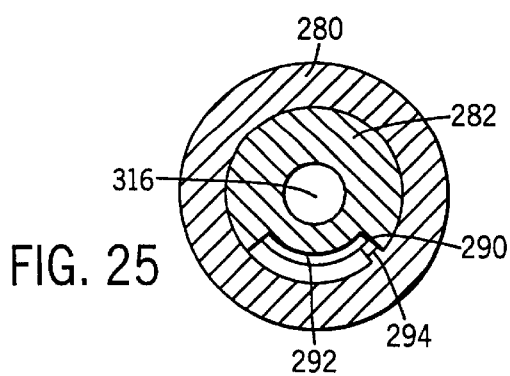
FIG. 25 is a sectional view taken along line 25—25 of FIG. 24.
Figure 27:
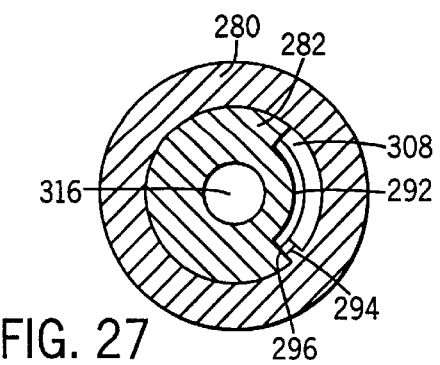
FIG. 27 is a sectional view taken along line 27—27 of FIG. 26.
Figure 24:
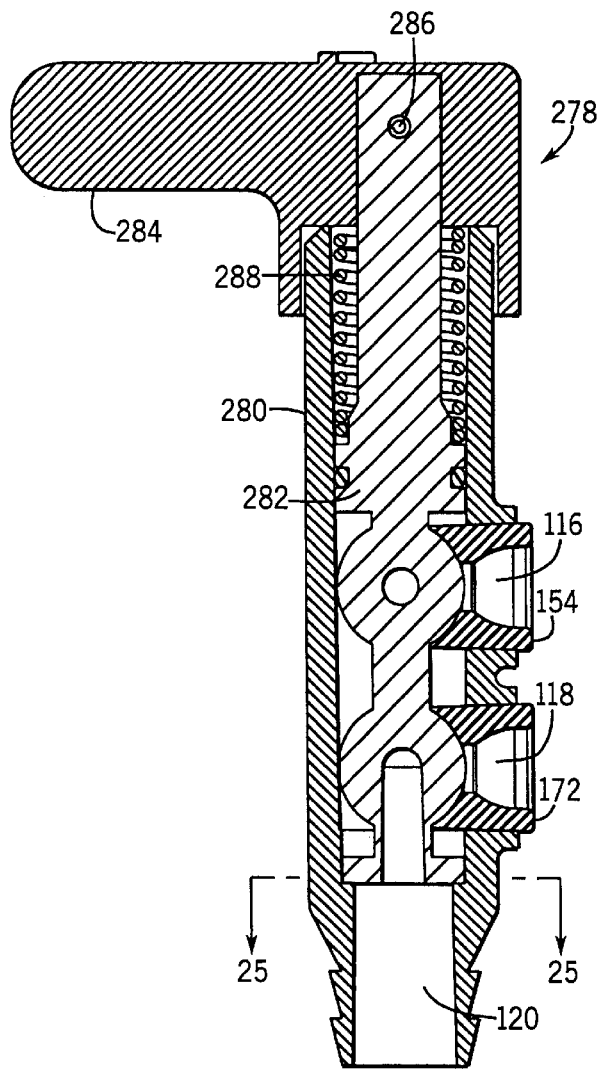
FIG. 24 is a sectional view of another embodiment of a drain valve in accordance with the invention.

FIGS. 15–18 show a further embodiment and use like reference numerals from above where appropriate to facilitate understanding. The rotational stops for the opening and closing movements of the valve 200 are moved from the handle to the piston. As shown in FIGS. 16 and 18, piston 136 has an arcuate slot 201 with shoulders 202 and 204 at the ends thereof. In the closed position of the valve, FIG. 15, piston 136 is in its clockwise rotated position, FIG. 16, with shoulder 204 stopped against radially inwardly projecting finger 206 formed on the inner cylindrical surface of housing 104. In the open position of the valve, FIG. 17, piston 136 is rotated 90° counter-clockwise, FIG. 18, and shoulder 202 is stopped against finger 206.

FIGS. 19–23 show a further embodiment and use like reference numerals from above where appropriate to facilitate understanding. Drain valve 218 has a housing 220 and an actuator member provided by a rotary piston 222 rotatable about a vertical axis and having an upper manually engageable operator handle 224 non-rotatably secured to piston 222 by pin 226 and biased by spring 228 to return to the closed position, FIGS. 19 and 20. In FIG. 20, shoulder 230 of arcuate slot 232 of piston 222 is stopped against radially inwardly projecting finger 234 of the inner cylindrical surface of housing 220. Piston 222 is rotated 90° counter-clockwise, as viewed in FIGS. 20 and 22, to the open position, FIG. 21, with shoulder 236 of arcuate slot 232 stopped against finger 234.

A vent passage 238, FIG. 21, has a first portion 240 extending radially in piston 222, relative to the noted vertical rotational axis of piston 222, and a second portion 242 extending axially in the piston. First portion 240 of the vent passage extends between an upstream end 244 and a downstream end 246. Second portion 242 of the vent passage extends between an upstream end 248 and a downstream end 250. Upstream end 244 of first portion 240 is continuous with and continuously communicates with downstream end 250 of second portion 242 of the vent passage including in each of the open and closed positions of the piston. Downstream end 246 of first portion 240 communicates with first port 116 when the piston is in the open position, FIG. 21, and is blocked from communication with first port 116 when the piston is in the closed position, FIG. 19. Upstream end 248 of second portion 242 communicates with third port 120 in each of the open and closed positions of the piston.

Drain passage 252, FIG. 21, has a first portion 254 extending radially in piston 222, and a second portion 256 extending axially in piston 222. First portion 254 extends between an upstream end 258 and a downstream end 260. Second portion 256 of the drain passage extends between an upstream end 262 and a downstream end 264. Downstream end 260 of first portion 254 is continuous with and in continuous communication with upstream end 262 of second portion 256 including in each of the open and closed positions of the piston. Upstream end 258 of first portion 254 communicates with second port 118 when the piston is in the open position, FIG. 21, and is blocked from communication with second port 118 when the piston is in the closed position, FIG. 19. Downstream end 264 of second portion 256 communicates with third port 120 in each of the open and closed positions of the piston, FIGS. 21 and 19, respectively.

FIGS. 24–29 show a further embodiment and use like reference numerals from above where appropriate to facilitate understanding. Drain valve 278 has a housing 280 and an actuator member provided by a rotary piston 282 rotatable about a vertical rotation axis and having an upper handle 284 non-rotatably secured to piston 282 by pin 286 and biased to a closed position by return spring 288. In the closed position, FIG. 24, shoulder 290, FIG. 25, of arcuate slot 292 on the outer surface of piston 282 is stopped against radially inwardly projecting finger 294 of the inner cylindrical surface of drain valve housing 280. Upon rotation of the piston 90° counter-clockwise, as viewed in FIGS. 25 and 27, to the open position, FIG. 26, shoulder 296 of arcuate slot 292 is stopped against finger 294.

Figure 26:
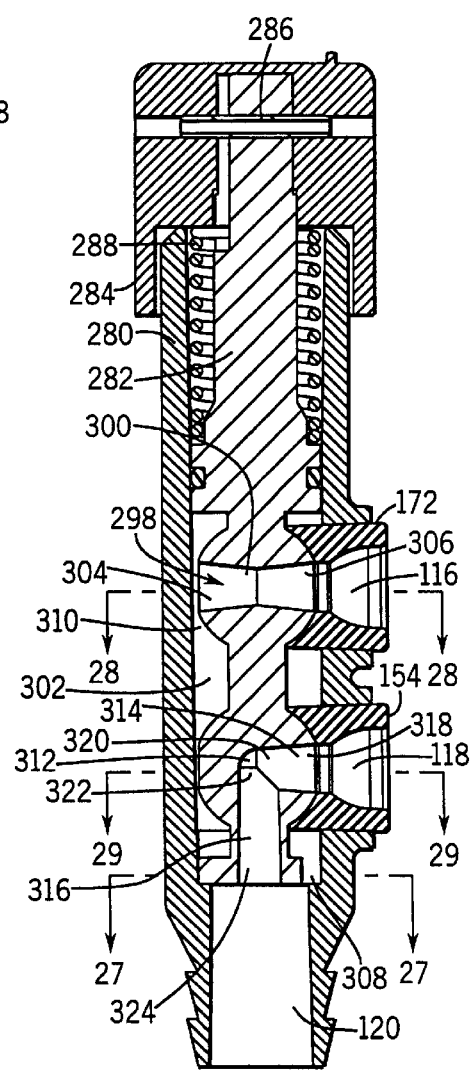
FIG. 26 is a sectional view showing the valve of FIG. 24 in the open position.
Figure 40:
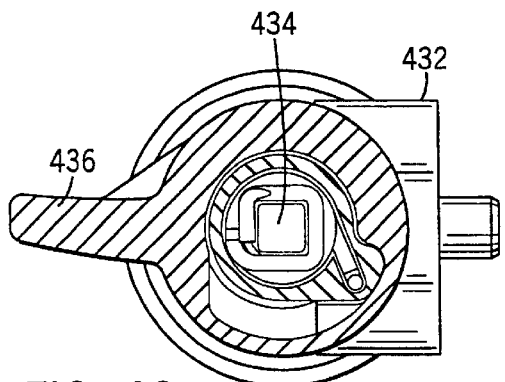
FIG. 40 is a sectional view taken along line 40—40 of FIG. 39.
Figure 42:
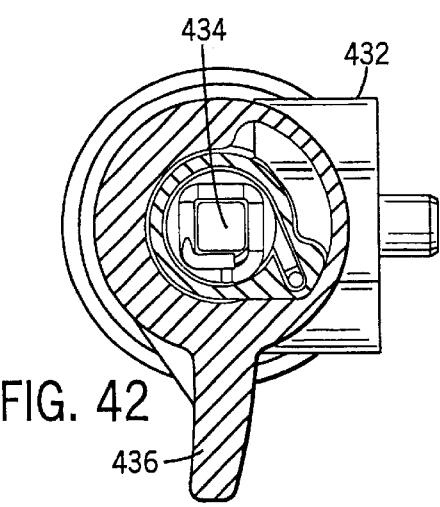
FIG. 42 is a sectional view taken along line 42—42 of FIG. 41.
Figure 39:
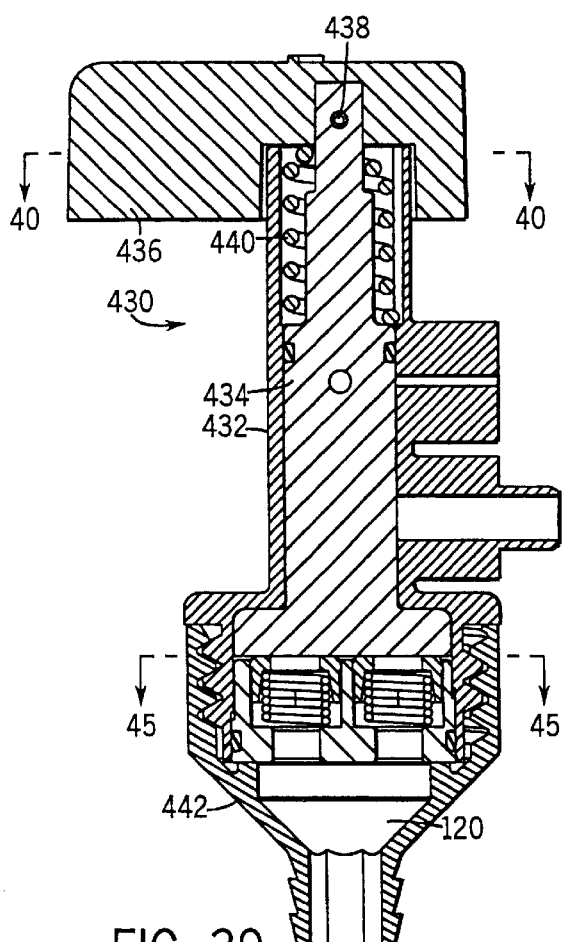
FIG. 39 is a sectional view showing another embodiment of a drain valve in accordance with the invention.

A vent passage 298, FIG. 26, has a first portion 300 extending radially through piston 282, relative to the noted vertical rotational axis, and a second portion 302 extending axially along a gap between piston 282 and drain valve housing 280. First portion 300 of the vent passage extends between an upstream end 304 and a downstream end 306. Second portion 302 of the vent passage extends between an upstream end 308 and a downstream end 310. Upstream end 304 of the first portion 300 is continuous with and continuously communicates with downstream end 310 of second portion 302 of the vent passage including in each of the open and closed positions of the piston. Downstream end 306 of first portion 300 communicates with first port 116 when the piston is in the open position, FIGS. 26, 28, and is blocked from communication with first port 116 when the piston is in the closed position, FIG. 24. Upstream end 308 of second portion 302 communicates with third port 120 in each of the open and closed positions of the piston.

Drain passage 312, FIG. 26, has a first portion 314 extending radially in the piston, and a second portion 316 extending axially in the piston. First portion 314 extends between an upstream end 318 and a downstream end 320. Second portion 316 of the drain passage extends between an upstream end 322 and a downstream end 324. Downstream end 320 of first portion 314 is continuous with and in continuous communication with upstream end 322 of second portion 316 of the drain passage including in each of the open and closed positions of the piston. Upstream end 318 of first portion 314 is in communication with second port 118 when the piston is in the open position, FIGS. 26, 29, and is blocked from communication with second port 118 when the piston is in the closed position, FIG. 24. Downstream end 324 of second portion 316 is in communication with third port 120 in each of the open and closed positions of the piston.

FIGS. 30–38 show a further embodiment and use like reference numerals from above where appropriate to facilitate understanding. Drain valve 340 includes a drain valve housing 342 and an actuator member provided by a rotary piston 344 rotatable about a vertical rotation axis and having an upper manually engageable handle 346 non-rotatably secured to piston 344 by pin 348 and biased to the closed position, FIGS. 30, 34, 38, by return spring 350. In the closed position, radially outwardly projecting finger 352, FIG. 31, on the outer surface of piston 344 is stopped against shoulder 354 of an arcuate slot 356 formed in the inner cylindrical surface of drain valve housing 342. Upon 90° clockwise rotation of the piston, as viewed in FIGS. 31 and 33, to the open position, FIG. 32, finger 352, FIG. 33, is stopped against shoulder 358 of arcuate slot 356.

Drain valve 340 includes an upper cap 360, FIG. 30, thread mounted on housing 342. Spring 350 axially bears between cap 360 and a shoulder 362 on the piston and, in addition to the noted rotary bias, also supplies axial bias such that piston 344 is axially biased downwardly against a pair of lower O-ring seals 364 and 366, FIGS. 30, 34, 37, 38. O-ring 364 is aligned with lower drain port 368 in lower horizontal wall 370 of housing 342. O-ring 366 is aligned with lower vent port 372 in horizontal wall 370. Ports 368 and 372 communicate with the noted third port 120 of the drain valve. Piston 344 is axially biased downwardly against O-rings 364 and 366 in sealing relation.

A vent passage 374, FIG. 32, has a first portion 376 extending radially in piston 344, and a second portion 378 extending axially in the piston. First portion 376 extends between an upstream end 380 and a downstream end 382. Second portion 378 of the vent passage extends between an upstream end 386 and a downstream end 388. Upstream end 380 of first portion 376 is continuous with and in continuous communication with downstream end 388 of second portion 378 of the vent passage including in each of the open and closed positions of the piston. Downstream end 382 of first portion 376 is in communication with first port 116 in each of the open and closed positions of the piston, FIGS. 32 and 30, respectively. This is accomplished by an arcuate groove 384, FIGS. 30, 32, 35, formed in the outer cylindrical surface of piston 344 communicating with downstream end 382 of first portion 376 of vent passage 374 and first port 116. Upstream end 386 of second portion 378 is in communication with third port 120 through O-ring 366 and vent port 372 when the piston is in the open position, FIGS. 32, 35, 37. Upstream end 386 is blocked from communication with vent port 372 and third port 120 when the piston is in the closed position, FIGS. 30, 38.

Drain passage 400, FIG. 32, has a first portion 402 extending radially in piston 344, and a second portion 404 extending axially in piston 344. First portion 402 extends between an upstream end 406 and a downstream end 408. Second portion 404 of the drain passage extends between an upstream end 412 and a downstream end 414. Downstream end 408 of first portion 402 is continuous with and in continuous communication with upstream end 412 of second portion 404 of the drain passage including in each of the open and closed positions of the piston. Upstream end 406 of first portion 402 communicates with second port 118 in each of the open and closed positions of the piston, FIGS. 32 and 30, respectively. This is accomplished by an arcuate groove 410 formed in the outer cylindrical surface of piston 344 communicating with upstream end 406 of first portion 402 of drain passage 400 and second port 118 in each of the open and closed positions of the piston. In an alternative, either or both of vent and drain passage arcuate grooves 384 and 410 may be formed in the inner cylindrical surface of the drain valve housing. Downstream end 414 of second portion 404 communicates with third port 120 through O-ring 364 and drain port 368 when the piston is in the open position, FIGS. 32 and 37. Downstream end 414 of second portion 404 is blocked from communication with drain port 368 and third port 120 when the piston is in the closed position, FIGS. 30 and 38.

FIGS. 39–45 show a further embodiment and use like reference numerals from above where appropriate to facilitate understanding. Drain valve 430, FIG. 39, includes a drain valve housing 432 having an actuator member provided by a rotary piston 434 rotatable about a vertical rotation axis and having an upper manually engageable handle 436 non-rotatably secured to piston 434 by pin 438 and biased to the closed position, FIGS. 39, 45, by return spring 440. A bottom end cap 442 is mounted to the housing in threaded relation to axially locate and retain the piston in the housing and to provide an axial stop for lower springs 444 and 446, FIG. 43, axially biasing annular sealing grommets 448 and 450 axially upwardly against the bottom of the piston at respective vent and drain ports 452 and 454. A lower cup-shaped retainer member 456 has respective vent and drain ports 458 and 460 therethrough aligned with respective vent and drain ports 452 and 454 and the respective openings in respective annular seals 448 and 450 and the respective hollow interiors of springs 444 and 446. Springs 444 and 446 bear axially between retainer member 456 and respective annular seals 448 and 450. Retainer member 456 is held in place by lower end cap 442 and is sealed to housing 432 by O-ring 462.

Figure 41:
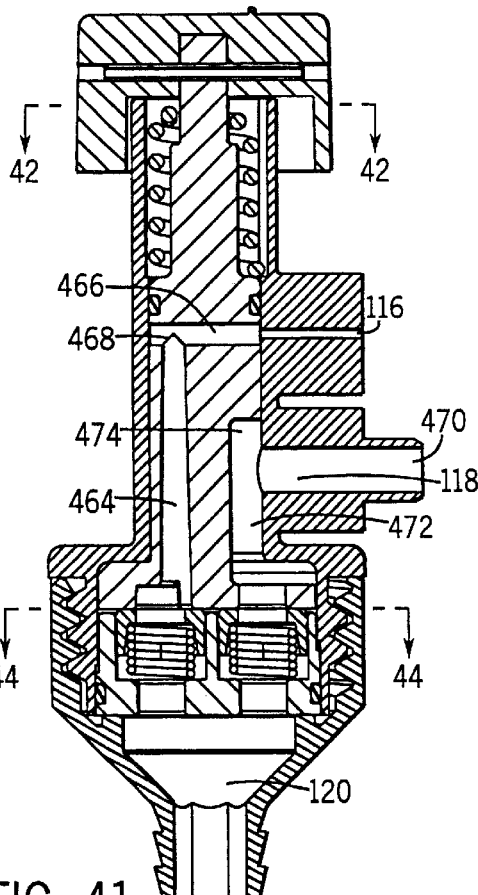
FIG. 41 is a sectional view showing the drain valve of FIG. 39 in the open position.
Figure 43:
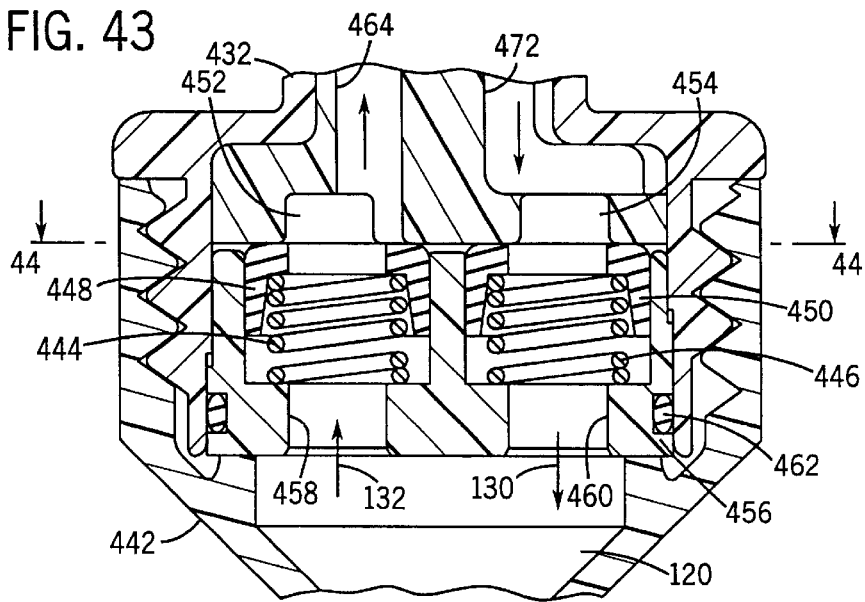
FIG. 43 is an enlarged view of a portion of FIG. 41.
Figure 44:
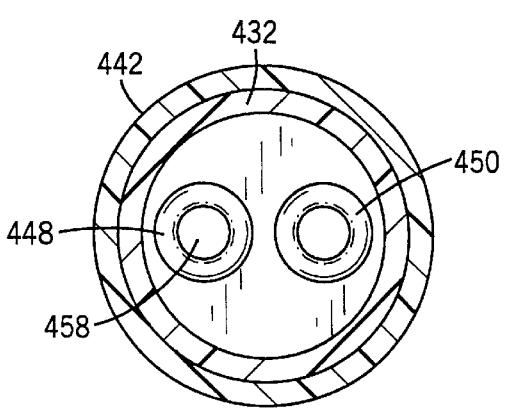
FIG. 44 is a sectional view taken along line 44—44 of FIG. 41.
Figure 45:
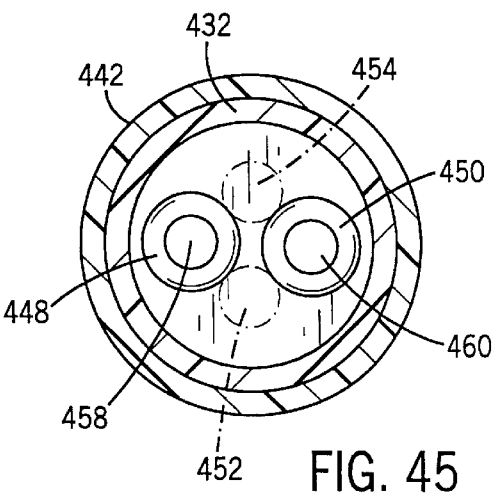
FIG. 45 is a sectional view taken along line 45—45 of FIG. 39.
Figure 46:
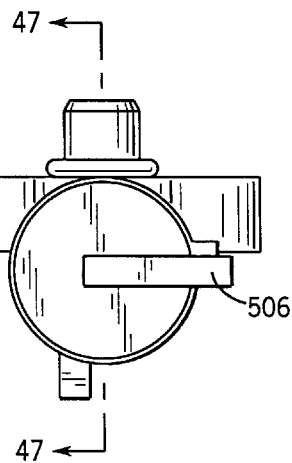
FIG. 46 is a top view of another embodiment of a drain valve in accordance with the invention.
Figure 48:
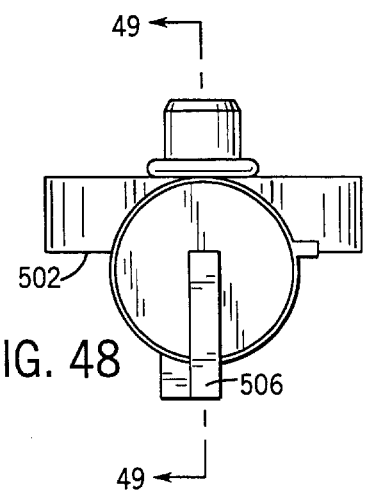
FIG. 48 is a top view showing the drain valve of FIG. 46 in the open position.
Figure 47:
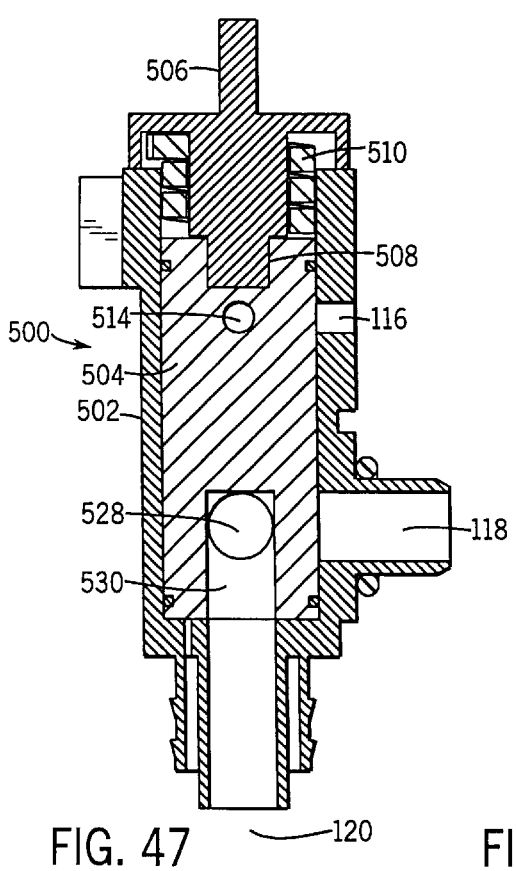
FIG. 47 is a sectional view taken along line 47—47 of FIG. 46.
Figure 49:
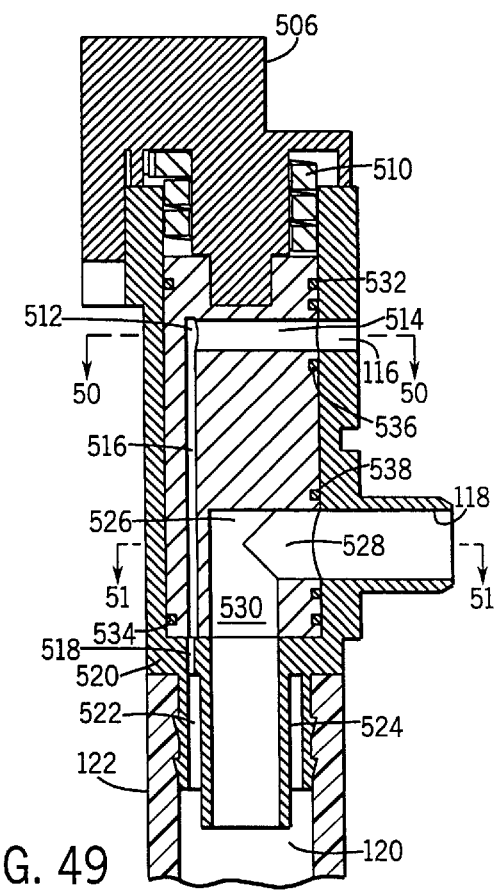
FIG. 49 is a sectional view taken along line 49—49 of FIG. 48.
Figure 56:
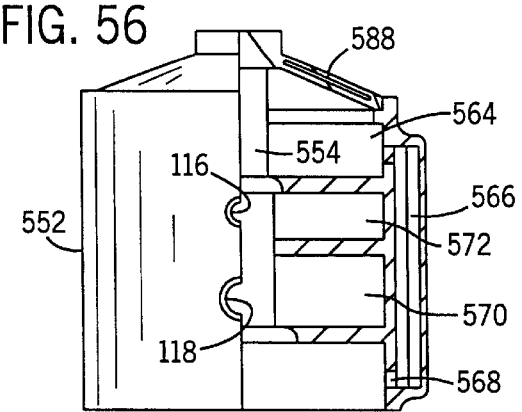
FIG. 56 is a side elevation view partially cut away of a further embodiment of the drain valve of FIG. 54.
Figure 57:
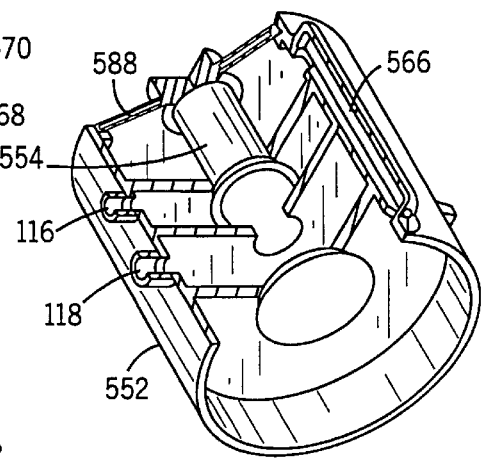
FIG. 57 is a perspective view from below, partially cut away, of the drain valve of FIG. 56.
Figure 58:
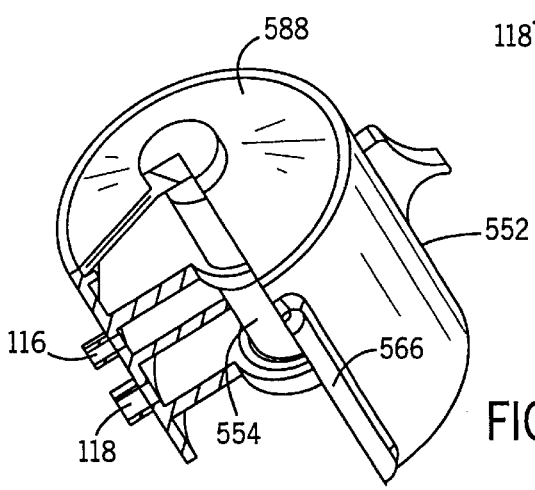
FIG. 58 is a perspective view from above, partially cut away, of the drain valve of FIG. 56.
Figure 59:
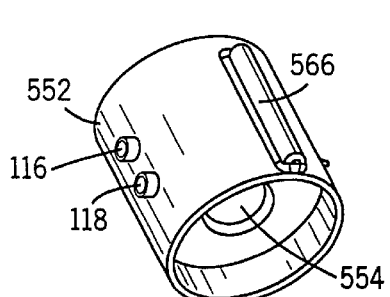
FIG. 59 is a perspective view from below of the drain valve of FIG. 56.
Figure 60:
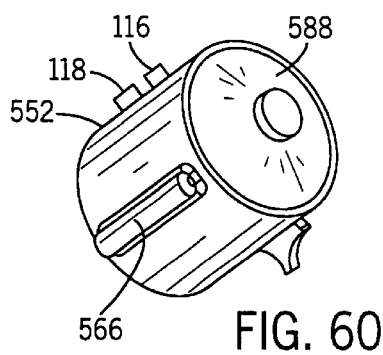
FIG. 60 is a perspective view from above of the drain valve of FIG. 56.

In the open position of drain valve 430, FIGS. 41, 43, 44, vent air 132 flows upwardly through third port 120, vent ports 458 and 452 then through portions 464 and 466, FIG. 41 of vent passage 468 to first port 116 communicating with vent opening 100. The collected water drain stream 130 flows from drain opening 98 to second port 118 then through portions 470 and 472 of drain passage 474 then through drain ports 454 and 460 to third port 120.

FIGS. 46–51 show a further embodiment and use like reference numeral from above where appropriate to facilitate understanding. Drain valve 500 includes a drain valve housing 502 and an actuator member provided by a rotary piston 504 rotatable about a vertical rotation axis and having an upper manually engageable handle 506 non-rotatably secured to piston 504 in keyed relation, such as square fit 508 or the like, and biased to the closed position, FIG. 47, by return spring 510. Vent passage 512, FIG. 49, extends from first port 116 radially at 514 in the piston then axially at 516 in the piston through lower vent port 518 through bottom wall 520 of the housing when the piston is in the open position, FIGS. 49, 50. Vent port 518 in turn communicates with annular passage 522 around drain port 524 at third port 120. Axial vent passage portion 516 is blocked from communication with vent port 518 in bottom wall 520 when the piston is in the closed position, FIG. 47. Radial portion 514 of the vent passage is blocked from communication with first port 116 when the piston is in the closed position, FIG. 47. Drain passage 526 has a portion 528 extending radially from second port 118 and a portion 530 extending axially and communicating with drain port 524 and third port 120 in each of the open and closed positions of the piston, FIGS. 49 and 47, respectively. O-rings 532 and 534 permit the noted rotation and seal the interior of the valve. Additional O-rings 536 and 538 are provided around respective portions 514 and 528 of respective vent and drain passages 512 and 526.

FIGS. 54–60 show a further embodiment and use like reference numerals from above where appropriate to facilitate understanding. Drain valve 550 includes a drain valve housing 552 and an actuator member provided by a reciprocal plunger 554 preferably reciprocal along a vertical reciprocation axis. A vent passage 556 has a first portion 558 extending from first port 116 radially in drain valve housing 552, relative to the noted reciprocation axis 560, a second portion 562 extending axially in housing 552 along plunger 554, a third portion extending radially in housing 552, a fourth portion 556 extending axially in housing 552, and a fifth portion 568 extending radially in housing 552. Radial portions 558 and 564 are joined by axial portion 560 when plunger 554 is in the open position, FIG. 55. Axial portion 566 is radially spaced from axial portion 562. Vent air 132 through the vent passage flows from third port 120 through portion 568 then axially through portion 566 then radially through portion 564 then axially through portion 562 then radially through portion 558 to first port 116 and vent opening 100. Housing 552 has a drain chamber 570 and a vent chamber 572 spaced from each other by a dividing wall 574. Plunger 554 reciprocates in the vent and drain chambers between open and closed positions, FIGS. 55 and 54, respectively. In the open position, FIG. 55, collected water 130 flows from drain chamber 570 along plunger 554 into third port 120, and vent air 132 flows in the opposite direction through third port 120 toward plunger 554 and then enters the vent passage at portion 568. Drain passage 576 has a first portion 578 extending radially in drain valve housing 552, relative to axis 560, and a second portion 580 extending axially along plunger 554 to third port 120. O-ring seals 582, 584, 586 are provided along the plunger for sealing the respective passages. A self-biasing molded rubber or plastic cap 588 is secured to the top of the plunger and biases the plunger upwardly to the closed position, FIG. 54. To open to valve, the operator manually pushes down on cap 588 as shown at arrow 589, FIG. 55. Alternatively, or in addition, a return spring 590 may be provided to bias plunger 554 upwardly to the closed position.

Figure 61:
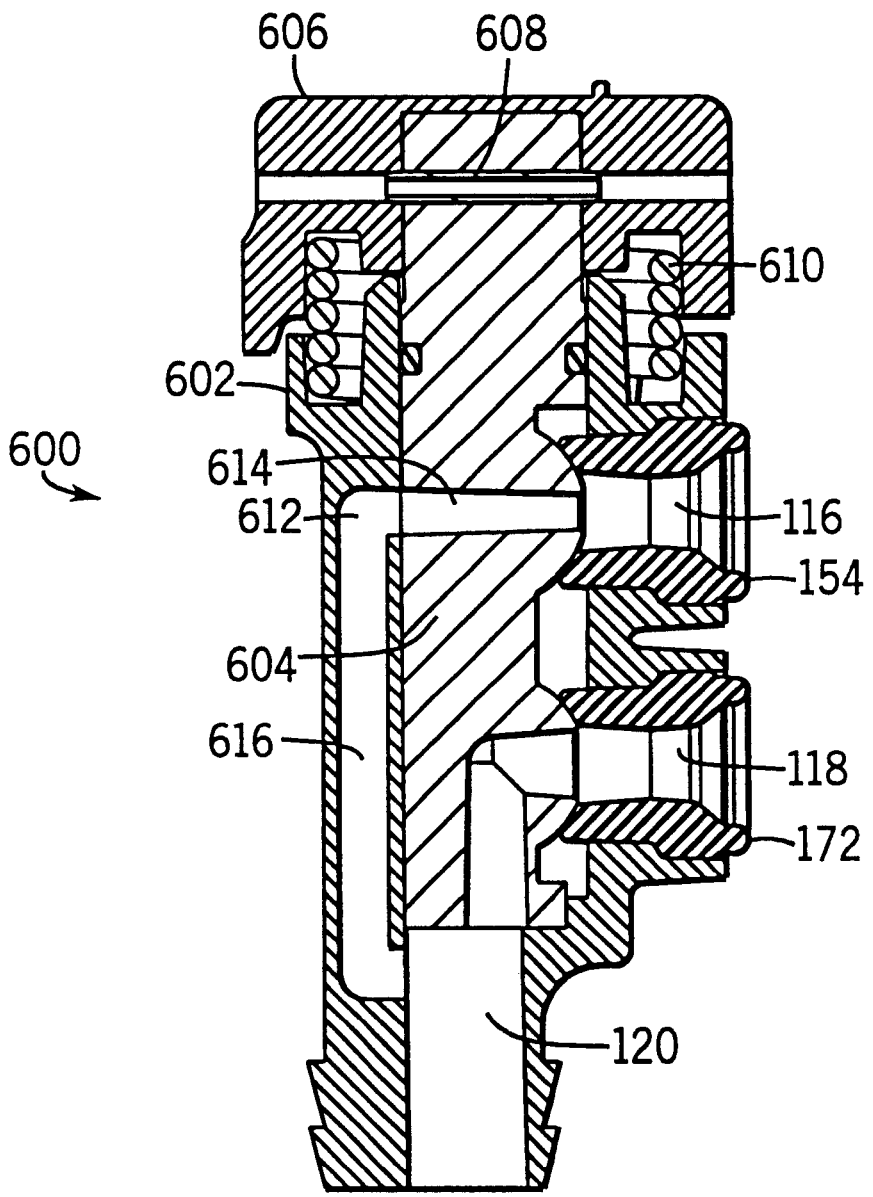
FIG. 61 is a sectional view of another embodiment of a drain valve in accordance with the invention.

FIG. 61 shows a further embodiment and uses like reference numerals from above where appropriate to facilitate understanding. Drain valve 600 includes a drain valve housing 602 having an actuator member provided by a rotary piston 604 rotatable about a vertical rotation axis and having an upper manually engageable handle 606 non-rotatably secured to piston 604 by pin 608 and biased by return spring 610, as above. Vent passage 612 has a first portion 614 extending radially through piston 604, relative to the noted rotation axis, and a second portion 616 extending axially through housing 602. The operation of drain valve 600 is like that described above except that the axial portion 616 of the vent passage extends through the drain valve housing 602 rather than extending along a gap between piston 604 and housing 602, and rather than extending through piston 604.

It is recognized that various equivalents, alternatives and modifications are possible within the scope of the appended claims.

What is claimed is:

1. A drain valve for a fuel filter water separator for an internal combustion engine, said fuel filter water separator having a housing defining a water collection space and a vent space, the housing having a wall with a drain opening therethrough for draining water from said water collection space, and having a vent opening therethrough and permitting incoming air to replace outgoing water, said engine having a running condition wherein said fuel filter water separator is pressurized, said engine having an off condition wherein said fuel filter water separator is not pressurized, said drain valve comprising a housing mounted to said fuel filter water separator housing and having a first port mating with said vent opening, a second port mating with said drain opening, and a third port, and an actuator member in said drain valve housing and actuable between a closed position blocking communication of said first port with said third port and blocking communication of said second port with said third port, and an open position providing communication of said first port with said third port and providing communication of said second port with said third port such that if said actuator member of said drain valve is actuated to said open position when said engine is in said off condition, collected water and vent air each flow through said third port in opposite directions, said actuator member comprising a reciprocal plunger reciprocal along an axis, and comprising vent passage having a first portion extending radially in said drain valve housing, relative to said axis, and a second portion extending axially in said drain valve housing, wherein said vent passage has a third portion extending radially in said drain valve housing and a fourth portion extending axially in said drain valve housing, said second portion extending axially along said plunger, said first and third portions being joined by said second portion, said fourth portion being radially spaced from said second portion.

2. The drain valve according to claim 1 wherein said vent passage has a fifth portion extending radially in said drain valve housing, such that vent air through said vent passage flows from said third port then through said fifth portion then axially through said fourth portion then radially through said third portion then axially through said second portion then radially through said first portion to said vent opening.

3. The drain valve according to claim 2 wherein said drain valve housing has a drain chamber and a vent chamber axially spaced from each other by a dividing wall, and wherein said plunger extends axially through said dividing wall and reciprocates in said drain and vent chambers between open and closed positions, such that in said open position, collected water flows from said drain chamber along said plunger into said third port, and vent air flows in the opposite direction through said third port toward said plunger and then enters said vent passage at said fifth portion.

4. A drain valve for a fuel filter water separator for an internal combustion engine, said fuel filter water separator having a housing extending axially along an axis and defining a water collection space and a vent space, the housing having a wall with a drain opening therethrough for draining water from said water collection space, and having a vent opening therethrough and permitting incoming air to replace outgoing water, said engine having a running condition wherein said fuel filter water separator is pressurized, said engine having an off condition wherein said fuel filter water separator is not pressurized, said drain valve comprising a housing mounted to said fuel filter water separator housing and having a first port mating with said vent opening, a second port mating with said drain opening, and a third port, and an actuator member in said drain valve housing and actuable between a closed position blocking communication of said first port with said third port and blocking communication of said second port with said third port, and an open position providing communication of said first port with said third port and providing communication of said second port with said third port such that if said actuator member of said drain valve is actuated to said open position when said engine is in said off condition, collected water and vent air each flow through said third port in opposite directions, and comprising a vent passage extending through said actuator member and said drain valve housing and communicating with each of said first and third ports when said actuator member is in said open position, and blocked from communication with at least one of said first and third ports when said actuator member is in said closed position.

5. The drain valve according to claim 4 wherein said vent passage has a first portion extending radially in said drain valve housing and in said actuator member, and a second portion extending axially in said drain valve housing, said second portion extending solely in said drain valve housing.

6. The drain valve according to claim 5 wherein said actuator member is a rotary piston rotatable about said axis, said vent passage first portion extends radially in said housing and in said piston, said vent passage second portion extends axially in said drain valve housing and is radially spaced from said piston by a portion of said drain valve housing therebetween.

7. The drain valve according to claim 6 comprising a seal radially bearing between said drain valve housing and said piston at said first port.

8. A drain valve for a fuel filter water separator for an internal combustion engine, said fuel filter water separator having a housing defining a water collection space and a vent space, the housing having a wall with a drain opening therethrough for draining water from said water collection space, and having a vent opening therethrough and permitting incoming air to replace outgoing water, said engine having a running condition wherein said fuel filter water separator is pressurized, said engine having an off condition wherein said fuel filter water separator is not pressurized, said drain valve comprising a housing mounted to said fuel filter water separator housing and having a first port mating with said vent opening, a second port mating with said drain opening, and a third port, and a rotary piston actuator member rotatable about an axis in said drain valve housing between a closed position blocking communication of said first port with said third port and blocking communication of said second port with said third port, and an open position providing communication of said first port with said third port and providing communication of second port with said third port such that if said rotary piston is rotated to said open position when said engine in said off condition, collected water and vent air each flow through said third port in opposite directions, a vent passage communicating with each of said first and third ports when said rotary piston is in said open position, and blocked from communication with at least one of said first and third ports when said rotary piston is in said closed position.

9. The drain valve according to claim 8 comprising a seal radially bearing between said drain valve housing and said piston at said first port.

10. The drain valve according to claim 8 comprising a seal axially bearing between said drain valve housing and said piston at said third port.

11. The drain valve according to claim 8 comprising a first seal radially bearing between said drain valve housing and said piston at said first port, and a second seal axially bearing between said drain valve housing and said piston at said third port.

12. The drain valve according to claim 8 wherein said vent passage has a radial portion communicating with said first port when said piston is rotated to said open position, and an axial portion communicating with said third port when said piston is rotated to said open position, and comprising at least one of a first seal radially bearing between said drain valve housing and said piston at said first port and a second seal axially bearing between said drain valve housing and said piston at said third port.

* * * * *